United States Patent

[11] 3,603,291

| [72] | Inventor | Edwin E. Baker |
| | | Rt. 1, Richwood, Ohio 43344 |
| [21] | Appl. No. | 862,773 |
| [22] | Filed | Oct. 1, 1969 |
| [45] | Patented | Sept. 7, 1971 |

[54] ANIMAL MARKING DEVICE
2 Claims, 4 Drawing Figs.

[52] U.S. Cl................................................ 119/1,
119/109, 248/343
[51] Int. Cl..................................................... A01k 11/00
[50] Field of Search........................................ 119/1, 106,
109, 96; 54/1; 248/343

[56] References Cited
UNITED STATES PATENTS

| 1,237,983 | 8/1917 | Werner | 119/1 |
| 2,487,557 | 11/1949 | Jourgensen | 54/1 |
| 2,605,744 | 8/1952 | Urbanski | 119/96 |

*Primary Examiner*—Aldrich F. Medbery
*Attorney*—Wilson & Fraser

ABSTRACT: An animal marking device to be worn by a male animal during the breeding season so constructed that when the animal has coition with a female, the female will be marked in such a manner that the stock breeder will be able to determine the time at which the period of gestation should end, should the animal have been rendered pregnant.

PATENTED SEP 7 1971 3,603,291

INVENTOR.
EDWIN E. BAKER
BY Wilson & Fraser
ATTORNEYS

ANIMAL MARKING DEVICE

CROSS-REFERENCE TO RELATED APPLICATIONS AND PATENTS

The following U.S. Pat. Nos. are related to the subject invention to which this application is directed:

| | |
|---|---|
| Jourgensen | 2,578,022 |
| Werner | 1,237,983 |
| Jourgensen | 2,487,557 |

BACKGROUND OF THE INVENTION

The invention relates to a marking device for animals. More particularly, this invention pertains to a marking device adapted to be worn by the male animal for purposes of placing a mark on female animals with which the male animal has coition.

Specially, the invention herein is of the type which is adapted to be affixed to the chest portion of an adjustable harness worn by the male animals, so that during the process of coition a mark is imparted on the back of the respective female sheep. By using such a device with a multicolored coding arrangement, stock breeders are readily able to ascertain which female animals have been fertilized, and additionally, which animals have been fertilized by particular males.

There have been several animal marking devices utilized in the prior art to accomplish the objective of code marking the female animals which have been fertilized in a herd. Generally, most of these marking devices are constructed cooperatively with an adjustable harness arrangement worn by the male animal. In the usual arrangement, a crayon holder is secured to a chest strap on the harness arrangement such that the crayon holder will rest on the lower chest area of the male animal.

These marking devices have generally been effective in providing the required marking on female animals; however, there have been several disadvantages with the existing marking devices thusly described. One particular disadvantage in the prior art devices is that there is no sufficient protection against the contamination of the crayon or marking material. In particular, in the construction of the existing marking devices, wherein the crayon holder normally rests in a horizontal position on the lower chest of the male animal, whenever the animal wearing the device reclines itself on the ground, the crayon often becomes contaminated with manure and other foreign matter situated on the ground. Once the crayon becomes so contaminated, it becomes ineffective as a marking device during the process of coition.

In view of these problems encountered in the prior art, it is an object of this invention to provide an improved and effective marking device for animals.

SUMMARY OF THE INVENTION

The invention herein described is comprised of a central breast strap with a looped neck strap being attached to one end thereof. Fastened at the opposite end of the breast strap are the ends of adjustable belly straps, which are adapted to fit around the belly of the male animal. Secured to a breast strap at the end thereof, adjacent to the next strap, is a crayon holder for holding a marking crayon therein in a substantially vertical position.

DESCRIPTION OF THE PREFERRED EMBODIMENT

Figure 1:
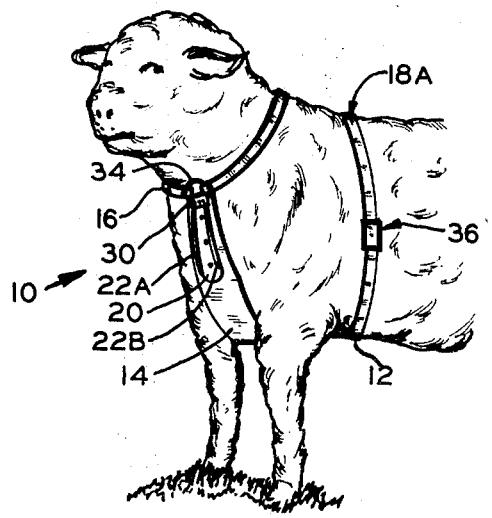
FIG. 1 is a view of the harness incorporating the subject invention, as worn by the male sheep.
Figure 3:
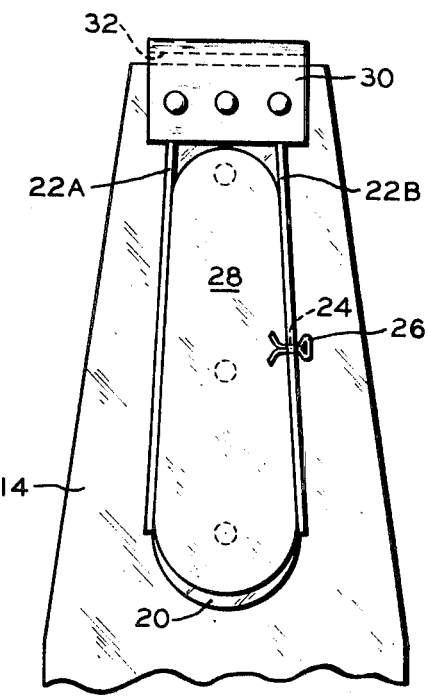
FIG. 3 is an enlarged elevational view of the crayon holder shown in FIG. 2.

Referring now to the drawings in which a preferred embodiment of the subject invention is shown, reference will be made to the words "upper" and "lower" and, in this respect, the word "upper" will be used in regard to that portion of the breast strap which is adjacent to the neck straps, while the word "lower" will be used in reference to the portion of the breast strap which is adjacent to the belly straps. In addition, the word "lateral" will be used, and in this respect, it will be used in reference to the sides of the breast strap extending between the upper and lower portion of the breast strap. Furthermore, the adaptation of the preferred embodiment shown in the drawings hereto will apply to the male sheep, commonly referred to as a ram. However, it is understood for purposes of this application, that the adaptation of the invention to a ram shall be for purposes of illustration only, and is not to be construed as limiting the scope of this invention to sheep only.

In particular reference to FIG. 1, a ram, generally shown by reference numeral 10, is wearing a harness 12 in the manner shown. Specifically, harness 12 is comprised of a breast or chest strap 14 which is situated against the upper breast area of the ram 10, a neck strap 16 which is joined at the throat area to the upper end of the breast strap 14, and body or belly straps 18A and 18B, which are joined to the lower end of the breast strap.

Breast or chest strap 14 is disposed longitudinally over the breast of the ram 10, with the upper portion thereof resting at the front bottom or throat portion of the ram's neck, and the lower portion of the breast strap 14 being tucked under to rest against the lower breast area of the ram 10. Breast strap 14 is constituted of a suitable and sturdy leather material, or some similar pliable and flexible webbing material.

Riveted to the upper portion of breast strap 14 is a metallic holder 20, for marking crayons and the like, made of a light steel metal, such as sheet metal. Located on the lateral sides of breast strap 14 are longitudinally extending flanges 22A and 22B, which are integral extensions of sheet metal forming the base of the holder 20. Flanges 22A and 22B converge inwardly towards the central longitudinal axis of holder 20, so as to form a bracketlike structure for grasping and holding appropriately marking crayons therein.

The upper and lower extremities of the flanges 22A and 22B are smoothly rounded on each end thereof, in order to avoid having any jagged or sharp metal contact the female sheet during the process of coition. Furthermore, in the middle of the longitudinal extent of each flange 22A and 22B, there is located a circular opening 24 of approximately one-eighth inch diameter. This opening is constructed so as to receive therein a cotter pin 26, which in turn is pierced through a colored marking crayon 28 disposed between flanges 22A and 22B in the holder 20. The cotter pin 26 serves to hold the crayon 28 against longitudinal movement between the flanges on the holder 20.

Riveted to the upper end of breast strap 14 is a metal plate 30, which has on its upper end a cylindrical passageway 32 extending laterally through that portion of the plate 30 which protrudes beyond the upper extremity of breast strap 14. Extending through passageway 32 is the straight portion of loop 34. The respective ends of neck strap 16 are joined to the loop 34, as shown in FIG. 1 The neck strap 16 is made of an appropriate size so that when placed around the ram's neck, the crayon holder 20 on the upper portion of the breast strap 14 will be disposed on the ram's chest just under the lower front portion of the ram's neck in a substantially vertical position.

Figure 2:
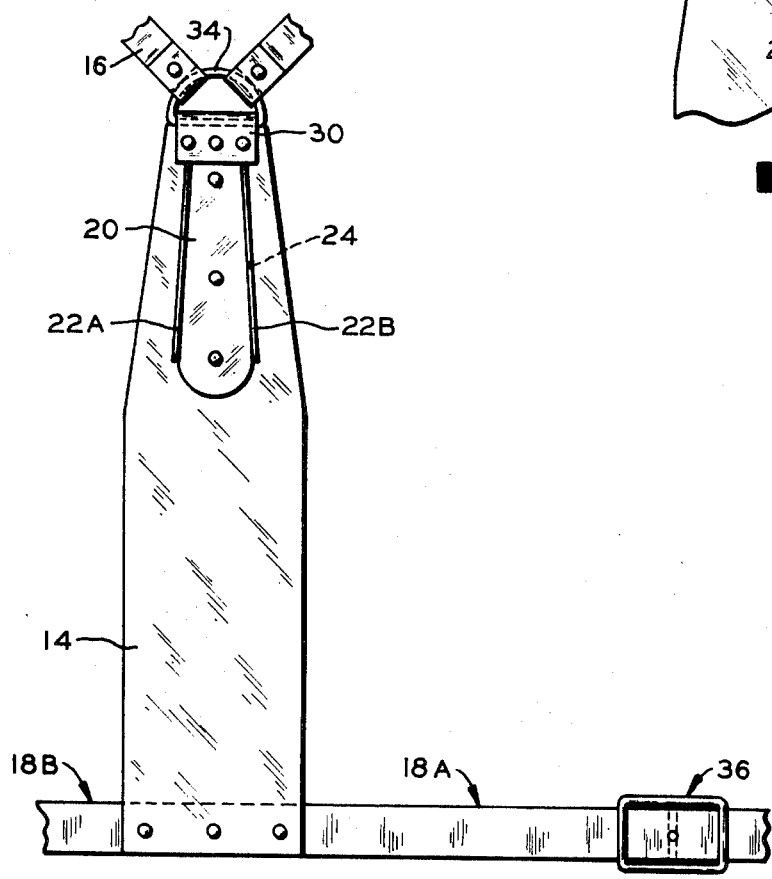
FIG. 2 is a top elevational view of the harness shown in FIG. 1.
Figure 4:
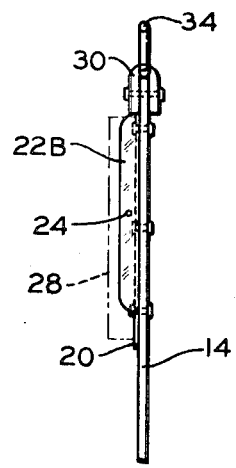
FIG. 4 is a side elevational view of the crayon holder illustrated in FIG. 3.

Secured by suitable means to the lower end of the breast strap 14 are belly straps 18A and 18B (FIG. 2). On the end of strap 18A is located a buckle 36 through which the end of belly strap 18B can be drawn for securing strap 18A to 18B around the upper belly area of the ram 10. Additionally, the buckle 36 serves as an adjustment means by which the straps 18A and 18B can be drawn tighter or looser for proper fitting of the overall harness 12.

In placing the harness 12 on the ram 10, the neck strap 16 is disposed around the neck of the ram, with the breast strap 14 extending from the upper chest area of the ram to the lower chest area between the ram's forelegs. The belly straps 18A and 18B are then secured around the belly of the ram. In its proper position, the breast strap 14 will expose holder 20 towards the front of the ram at the upper chest portion, as shown in FIG. 1, and will be effectively vertically disposed. In this position, the holder 20 and the crayon 28 therein will not become contaminated whenever the ram lies prone on the ground. Additionally, the crayon holder 20 being so disposed on the upper chest area of the ram can still fulfill its marking function during the process of coition.

The lower portion of the crayon 28 should be disposed at approximately 3 inches above the tip of the brisket of the ram in order to achieve the most desirable results.

While a specific embodiment of the subject invention has been shown as limited to sheep, the scope of this invention is not to be construed as being so limited, or being limited to the exact details of the embodiment as shown and described in this application.

According to the provisions of the patent statutes, I have explained the principles and mode of my invention and have illustrated and described what I now consider to represent its best embodiment. However, I desire to have it understood that, within the scope of the appended claims, the invention may be practiced otherwise than as specifically illustrated and described.

What I claim is:

1. An animal marking device comprising:
   a chest strap positioned and resting on a normally non-ground-engaging portion of the animal and having an upper and a lower end;
   a circumferentially looped neck strap to extend around the neck of the animal, the throat portion of said neck strap being joined to the upper end of said chest strap;
   a body or belly strap means connected to the lower end of said chest strap, said body or belly strap means having fastening means thereon for joining said body or belly strap means around the belly girth of the animal, and
   a marking device located on said chest strap in a vertical manner adjacent said neck strap for contacting a body portion of another animal during coition.

2. The invention defined in claim 1 wherein said neck strap has a circumference substantially equal to the circumference of the animal's neck.